(12) United States Patent  
Liang et al.

(10) Patent No.: US 8,736,759 B2
(45) Date of Patent: May 27, 2014

(54) METHODS AND RELATED APPARATUS MAKING EFFECTIVE USE OF BANDWIDTH OF STORAGE DEVICE TO GENERATE INTERPOLATED FRAMES

(75) Inventors: Chin-Chuan Liang, Taichung (TW); Siou-Shen Lin, Taipei County (TW); Te-Hao Chang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1150 days.

(21) Appl. No.: 12/185,826

(22) Filed: Aug. 5, 2008

(65) Prior Publication Data

US 2010/0033630 A1 Feb. 11, 2010

(51) Int. Cl.
*H04N 7/01* (2006.01)
(52) U.S. Cl.
USPC ........... 348/459; 348/509; 348/441; 348/448; 348/452; 348/555; 348/556
(58) Field of Classification Search
USPC ................. 348/441, 448, 452, 509, 555–556, 348/558–559, 459
See application file for complete search history.

(56) References Cited

U.S. PATENT DOCUMENTS

| 4,982,280 | A | * | 1/1991 | Lyon et al. .................... 348/448 |
| 5,495,300 | A | | 2/1996 | de Haan et al. |
| 6,411,341 | B1 | | 6/2002 | De Haan et al. |
| 6,580,463 | B2 | * | 6/2003 | Swartz .......................... 348/558 |
| 8,004,607 | B2 | * | 8/2011 | Eymard et al. ................ 348/452 |
| 2005/0226463 | A1 | * | 10/2005 | Suzuki et al. ................. 382/103 |
| 2005/0249282 | A1 | * | 11/2005 | Landsiedel et al. ...... 375/240.12 |
| 2007/0291169 | A1 | | 12/2007 | Eymard |

FOREIGN PATENT DOCUMENTS

| TW | 200428873 | 12/2004 |
| TW | 200534704 | 10/2005 |
| TW | 200814777 | 3/2008 |

* cited by examiner

*Primary Examiner* — Pankaj Kumar
*Assistant Examiner* — Charles N Hicks
(74) *Attorney, Agent, or Firm* — Winston Hsu; Scott Margo

(57) ABSTRACT

A method of interpolated frame generation and input source detection includes: receiving input frames; storing at least a first frame of successive frames in the input frames into a storage device under a film mode; comparing the stored first frame with a second frame of the successive frames not stored in the storage device to generate a first comparison result for determining whether to exit the film mode; and reading frames stored in the storage device to generate interpolated frames under the film mode.

19 Claims, 7 Drawing Sheets

| Display frame rate / Source frame | Display frame rate 50/60 Hz | Display frame rate 100/120 Hz |
|---|---|---|
| Video frames with transmission frame rate 50/60 Hz (source frame rate is 50/60 fps) | No interpolation | Video mode interpolation (double frame rate interpolation) |
| Film frames with transmission frame rate 50/60 Hz (source frame rate is 24/25/30 fps) | Film mode interpolation(original repeated frames are replaced by interpolated frames) | Film mode interpolation(original repeated frames are replaced by more than one interpolated frames) |

FIG. 1 RELATED ART

METHODS AND RELATED APPARATUS MAKING EFFECTIVE USE OF BANDWIDTH OF STORAGE DEVICE TO GENERATE INTERPOLATED FRAMES

BACKGROUND

The present invention relates to a video processing scheme, and more particularly, to a method and related apparatus for generating interpolated frames according to input frame source.

Frame rate conversion from a lower rate to a higher rate can be achieved by frame repeating or motion compensated interpolation such as motion judder cancellation (MJC). Frame rate conversion is required when a frame rate associated with source frames is different from the display frame rate of a display device. In general, there are several common source frame rates, such as 50/60 frames per second (i.e., 50/60 Hz) for video source, or 50 Hz with 25 frames per second or 60 Hz with 24/30 frames per second for film source. For example, video frames with 50 Hz frame rate are adopted in the PAL system (European standard) while video frames with 60 Hz frame rate are used in the NTSC system (US standard). In contrast, film frames are usually captured with a rate (e.g. 24/25/30 Hz) that is much lower than the video frames (e.g. 50/60 Hz). Consequently, some frames of the film frames are repeated to produce a sequence of frames with a rate of 50/60 Hz.

For example, for a DVD player in Taiwan, a transmission frame rate is 60 Hz in common. If source film frames are originally captured at 24/30 frames per second, image data received by the DVD player will include repeated image content. In particular, the image data is called a 2:2 sequence if the source film frames are captured at 30 Hz initially; otherwise, the image data is called a 3:2 sequence if the source film frames are captured at 24 Hz. In order to display the image on a display device in a smooth manner, repeated frames in the source film frames are replaced by one or more interpolated frames. FIG. 1 shows a table illustrating various interpolation methods that can be used for displaying source frames having different frame rates at different display frame rates. In the first case, since the input source frame rate 50/60 Hz is identical to the display frame rate 50/60 Hz, frame interpolation is not needed. In the second case, in order to display video frames having a frame rate 50/60 Hz at a display frame rate 100/120 Hz, video mode interpolation is required for achieving double frame rate interpolation. That is, one interpolated frame is inserted between every two adjacent video frames. In the third case, although the film frames have a transmission frame rate identical to the display frame rate (both are 50/60 Hz), a film mode interpolation is used for replacing repeated frames by interpolated frames, where the repeated frames are originally applied to increasing a frame rate of the film frames from the capture frame rate 24/25/30 Hz to the transmission frame rate 50/60 Hz. The fourth case applies the film mode interpolation, so the repeated frames are replaced by more than one interpolated frames. For example, if film frames having a capture frame rate of 30 frames per second are displayed at a display frame rate of 120 Hz, three out of every four frames are generated by interpolation while only one frame is an original source film frame.

FIG. 2 is a diagram illustrating a conventional motion compensated interpolation device 200 and a timing diagram of operation of the interpolation device 200. As shown in the top half of FIG. 2, the device 200 includes a processing circuit 205 and a memory 210, where incoming frames are first written into the memory 210 and then the processing circuit 205 analyzes motion vectors associated with the incoming frames stored in the memory 210 to generate interpolated frames. Thus, the memory 210 needs to allocate part of bandwidth to a write data channel $W_0$ in FIG. 2 for receiving the incoming frames. Simultaneously, the processing circuit 205 also reads data stored in the memory 210 to analyze the incoming frames, e.g., the processing circuit 205 may read data of two frames from the memory 210 each time to generate an interpolated frame for achieving double frame rate conversion. Therefore, in this situation, the memory 210 also allocates part of bandwidth to read data channels $R_1$ and $R_2$ in FIG. 2 for transmitting data to the processing circuit 205. Moreover, another read data channel $R_3$ will also occupy part of bandwidth of the memory 210 due to film mode detection.

Referring to the bottom half of FIG. 2, it is assumed that the incoming frames are comprised by video frames $A_0$, $B_0$, $F_0$, $G_0$, and film frames $C_0$, $C_1$, $D_0$, $D_1$, $E_0$, $E_1$ (i.e., a 2:2 sequence), where the film frames $C_1$, $D_1$, and $E_1$ are copies of the film frames $C_0$, $D_0$, and $E_0$, respectively. In this example, the device 200 performs double frame rate up-conversion (e.g., converting the transmission frame rate 50 Hz to the display frame rate 100 Hz), and also performs the film mode detection upon the incoming frames for deciding how to produce interpolated frames so as to generate the desired output frames shown in FIG. 2. The frame $A_0B_0$ is an interpolated frame inserted between the video frames $A_0$ and $B_0$ while the frames $C_0D_0$, $C_0D_0'$, and $C_0D_0''$ are different interpolated frames inserted between the film frames $C_0$ and $D_0$; other interpolated frames between video/film frames are also processed in a similar manner. Performing the film mode detection is usually to detect whether two adjacent frames are duplicates or not at each time; if two adjacent frames are found to be different, the two adjacent frames are estimated as video frames and then an interpolated frame is directly generated according to these video frames without occupying part of bandwidth of the memory 210 to read another data from the memory 210. For instance, when it is detected that the frame $A_0$ is different from the frame $B_0$, the processing circuit 205 can directly use the frames $A_0$ and $B_0$ to generate the interpolated frame $A_0B_0$ without reading other data from the memory 210. However, if it is detected that frames $C_0$ and $C_1$ are duplicates (i.e., the frames $C_0$ and $C_1$ are film frames), the processing circuit 205 needs to read the frame $D_0$ from the memory 210 through the above-mentioned read data channel $R_3$, for generating the interpolated frames $C_0D_0$, $C_0D_0'$, and $C_0D_0''$. In this situation, the bandwidth of the memory 210 is occupied by at least the above-mentioned data channels $W_0$, $R_1$, $R_2$, and $R_3$. Additionally, in another example, if the incoming frames include a 3:2 sequence instead of the 2:2 sequence, two frames for interpolation may be different from two adjacent frames for film mode detection at one time since a original source frame in the 3:2 sequence is followed by one or two repeated frame(s). That is, the processing circuit 205 requires four read data channels. In other words, in order to convert a film input originally captured at 24 or 30 frames per second to a display output with 120 Hz, more bandwidth must be allocated to write frames into and to read frames from the memory 210, and the storage space of the memory 210 also need to be large enough for buffering these incoming frames. However, increasing the bandwidth and storage space of the memory 210 raises production costs.

SUMMARY

Methods and related apparatuses making effective use of the bandwidth and storage capacity of a storage device for generating interpolated frames are provided.

According to an embodiment of the present invention, a method of interpolated frame generation and input source detection is disclosed. The method comprises the following steps of: receiving input frames; storing at least a first frame of successive frames in the input frames into a storage device under a film mode; comparing the stored first frame with a second frame of the successive frames not stored in the storage device to generate a first comparison result for determining whether to exit the film mode; and reading frames stored in the storage device to generate interpolated frames under the film mode.

According to an embodiment of the present invention, a method of input source detection is disclosed. The method comprises the following steps of: receiving input frames; storing the input frames into a storage device under a video mode; under the video mode, reading two of successive frames from the storage device to generate a second comparison result for determining whether to enter a film mode; and entering the film mode when the second comparison result matches a predefined pattern.

According to an embodiment of the present invention, an apparatus of interpolated frame generation and input source detection is further disclosed. The apparatus comprises a storage device and a processing circuit. The storage device is utilized for storing at least a first frame of successive frames in input frames under a film mode. The processing circuit is used for receiving the input frames, reading frames stored in the storage device to generate interpolated frames under the film mode, and comparing the stored first frame with a second frame of the successive frames not stored in the storage device to generate a first comparison result for determining whether to exit the film mode. These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram showing a table illustrating various interpolation methods for displaying source frames having different frame rates with different display frame rates.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
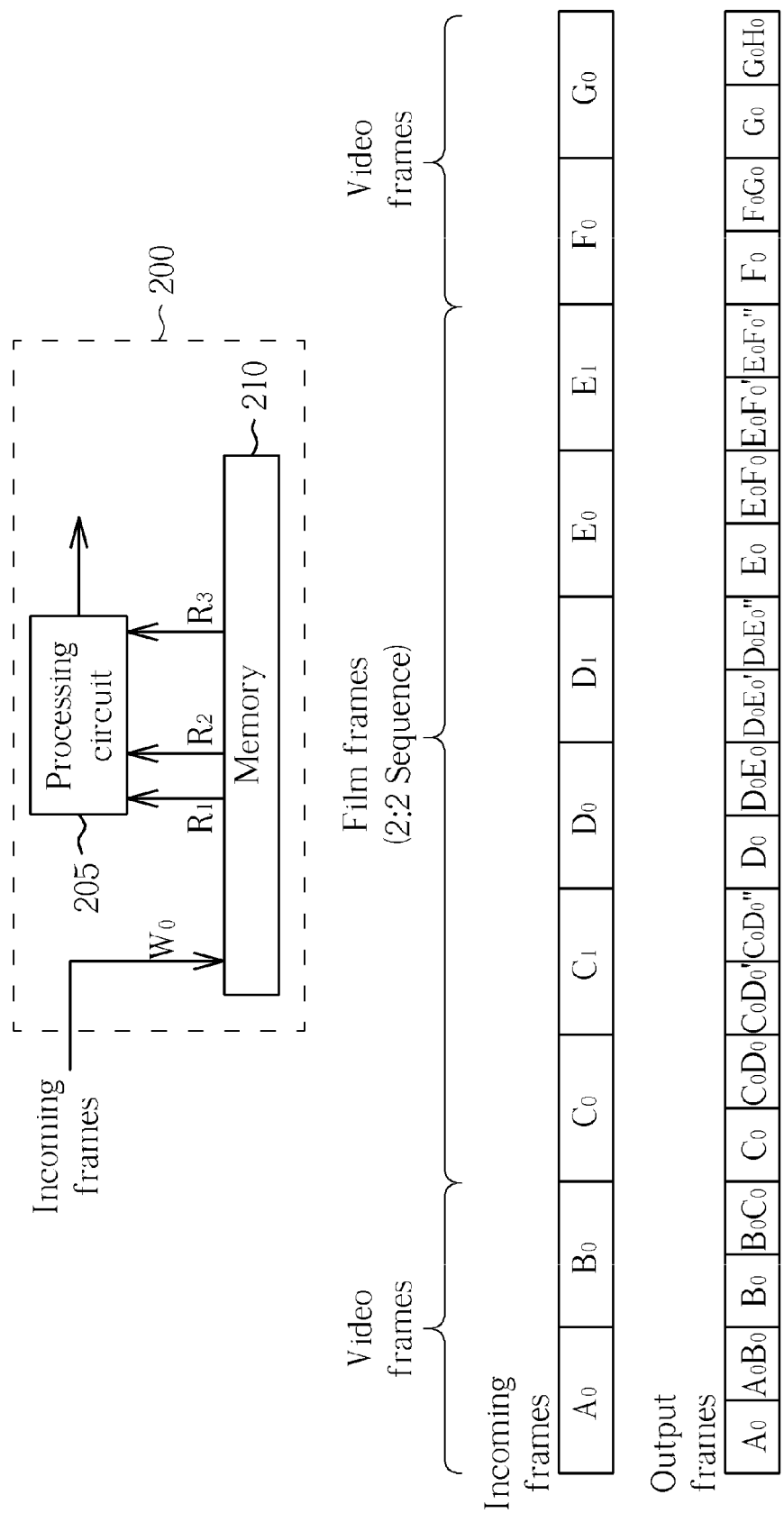
FIG. 2 is a diagram illustrating a conventional motion compensated interpolation device and a timing diagram of operation of the device.
Figure 3:
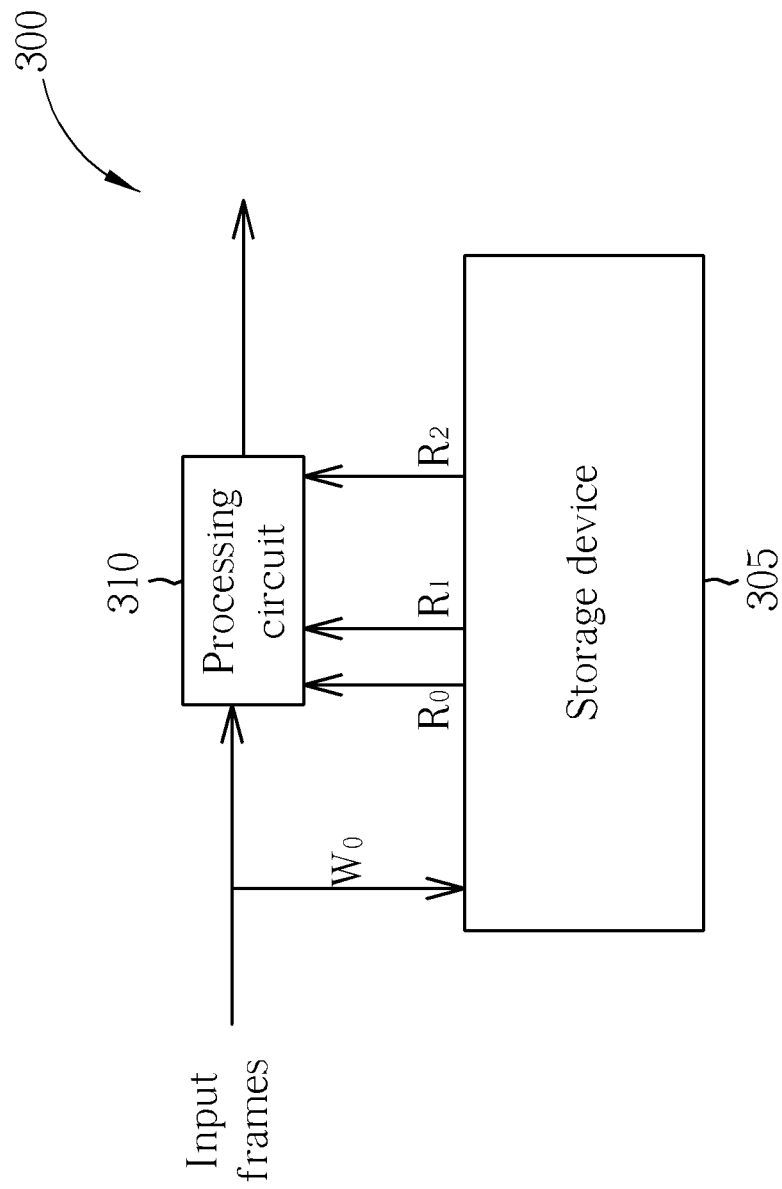
FIG. 3 is a diagram of an apparatus including a storage device and a processing circuit according to an embodiment of the present invention.

Please refer to FIG. 3. FIG. 3 is a diagram of an apparatus 300 including a storage device 305 and a processing circuit 310 according to an embodiment of the present invention. The apparatus 300 generates a plurality of interpolated frames according to a plurality of input frames and then combines the interpolated frames with non-repeated frames in the input frames to produce output frames those are displayed on a display device. Please note that in this embodiment the apparatus 300 has two operation modes, i.e., film mode and video mode, depending on the input source. When detecting that the input frames are film frames, the apparatus 300 enters the film mode and the storage device 305 stores at least a first frame of a plurality of successive frames in the input frames via a write data channel $W_0$, but does not store the second frame(s) in the successive frames when the second frame(s) is determined as duplicated frame(s) of the first frame under the film mode. The processing circuit 310 reads one frame from the storage device 305 via a read data channel $R_0$, to check whether to exit the film mode, where the one-read ($R_0$) and one-write ($W_0$) operations are not performed concurrently, for example, the storage device 305 are accessed by the one-read ($R_0$) and one-write ($W_0$) operations in an interlaced manner under the film mode. The processing circuit 310 also reads two frames stored in the storage device 305 via read data channels $R_1$ and $R_2$ and performs an interpolation operation upon the two frames read from the storage device 305, to generate an interpolated frame. Accordingly, it can avoid writing/reading repeated frames to/from the storage device 305 in the film mode, which consumes excessive bandwidth/storage space of the storage device 305. When detecting that the input frames are video frames instead of film frames, the storage device 305 stores every frame in the successive frames without discarding any frame since the successive frames are different from each other in the video mode. In the video mode, the processing circuit 310 only reads two frames via the read data channels ($R_1$ and $R_2$) at each clock cycle for performing interpolation and making a decision on whether to enter the film mode.

Figure 4:
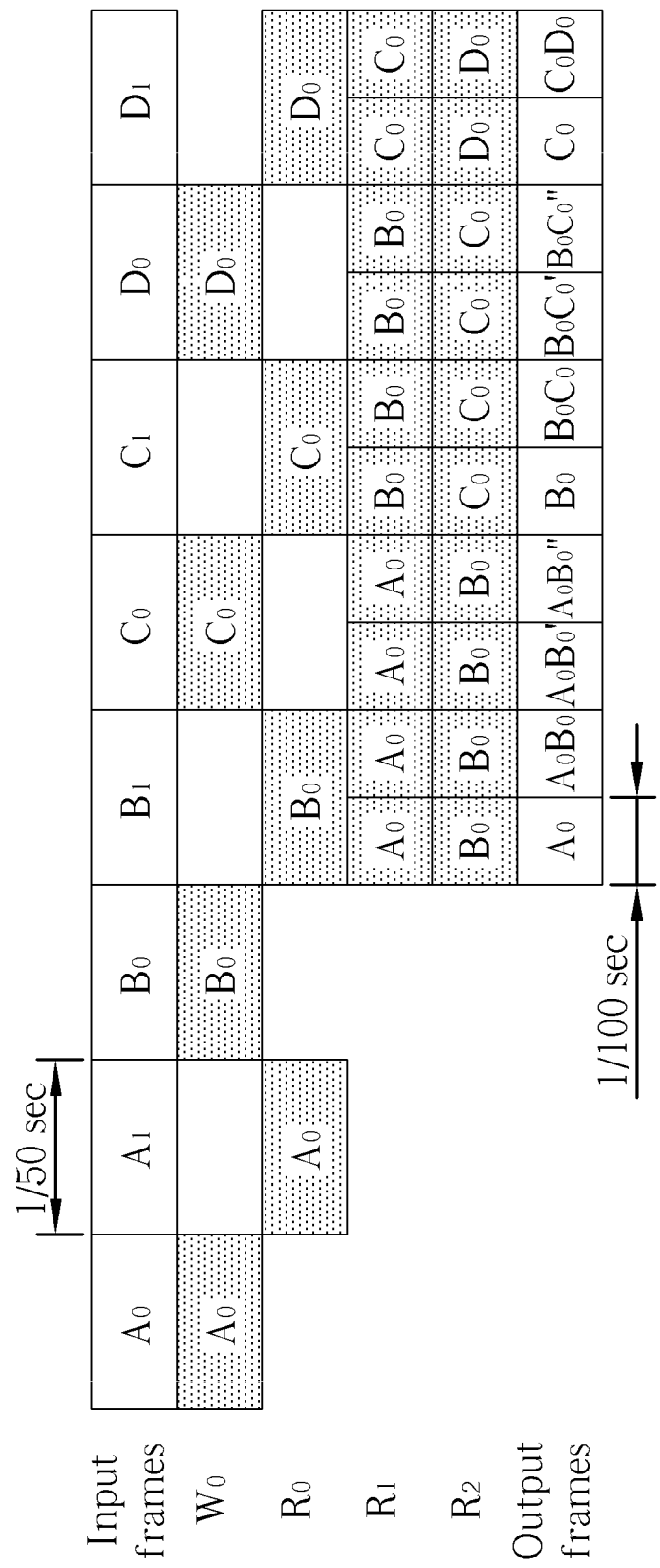
FIG. 4 is a timing diagram illustrating an exemplary operation of the apparatus 300 of FIG. 3 under the film mode.

The following are two examples illustrating the operation of the apparatus 300 under the film mode and the video mode, respectively. FIG. 4 is a timing diagram illustrating the operation of the apparatus 300 of FIG. 3 under the film mode. In this example, input frames include a sequence of film frames $A_0$, $A_1$, . . . , $D_0$, $D_1$, where the film frames $A_1$, $B_1$, $C_1$, and $D_1$ are copies of the film frames $A_0$, $B_0$, $C_0$, and $D_0$, respectively. The input frames have a transmission rate of 50 Hz, and the apparatus 300 is used to convert the input frames into desired output frames, which can be displayed at a frame rate of 100 Hz. The frames $A_0$ and $A_1$, $B_0$ and $B_1$, $C_0$ and $C_1$, $D_0$ and $D_1$ respectively belong to different groups consisting of two successive frames, where $A_0$, $B_0$, $C_0$, and $D_0$ are defined as the first frames while $A_1$, $B_1$, $C_1$, and $D_1$ are defined as the second frames. Because the apparatus 300 is under the film mode, the repeated frames $A_1$, $B_1$, $C_1$, and $D_1$ are not stored in the storage device 305 through the write data channel $W_0$ but are transmitted to the processing circuit 310. As a result, when reading the first frames $B_0$, $C_0$, and $D_0$ from the storage device 305 through a read data channel $R_0$, the processing circuit 310 compares the first frames $B_0$, $C_0$, and $D_0$ read from $R_0$ with the received second frames $B_1$, $C_1$, and $D_1$ to check whether the input frames are still film frames. The film mode detection and frame interpolation can thus be accomplished without storing the second frames $B_1$, $C_1$, and $D_1$. The processing circuit 310 reads two frames at each clock cycle through read data channels $R_1$ and $R_2$, and generates three interpolated frames (e.g. $A_0B_0$, $A_0B_0'$, $A_0B_0''$) following each first frame (e.g. $A_0$). In this embodiment, the three successive interpolated frames may be slightly different to alleviate the judder effect in the display moving pictures; however, the processing circuit 310 can generate the same interpolated frame for these three successive frames in some other embodiments. Accordingly, an advantage of the apparatus 300 compared to the related art is that less bandwidth of the storage device 305 is occupied. Particularly, the bandwidth amount being used by the above-mentioned data channels at any time is kept nearly constant, as there are at most three memory accesses at the same time (3 read operations or 1 write plus 2 read operations).

Figure 5:
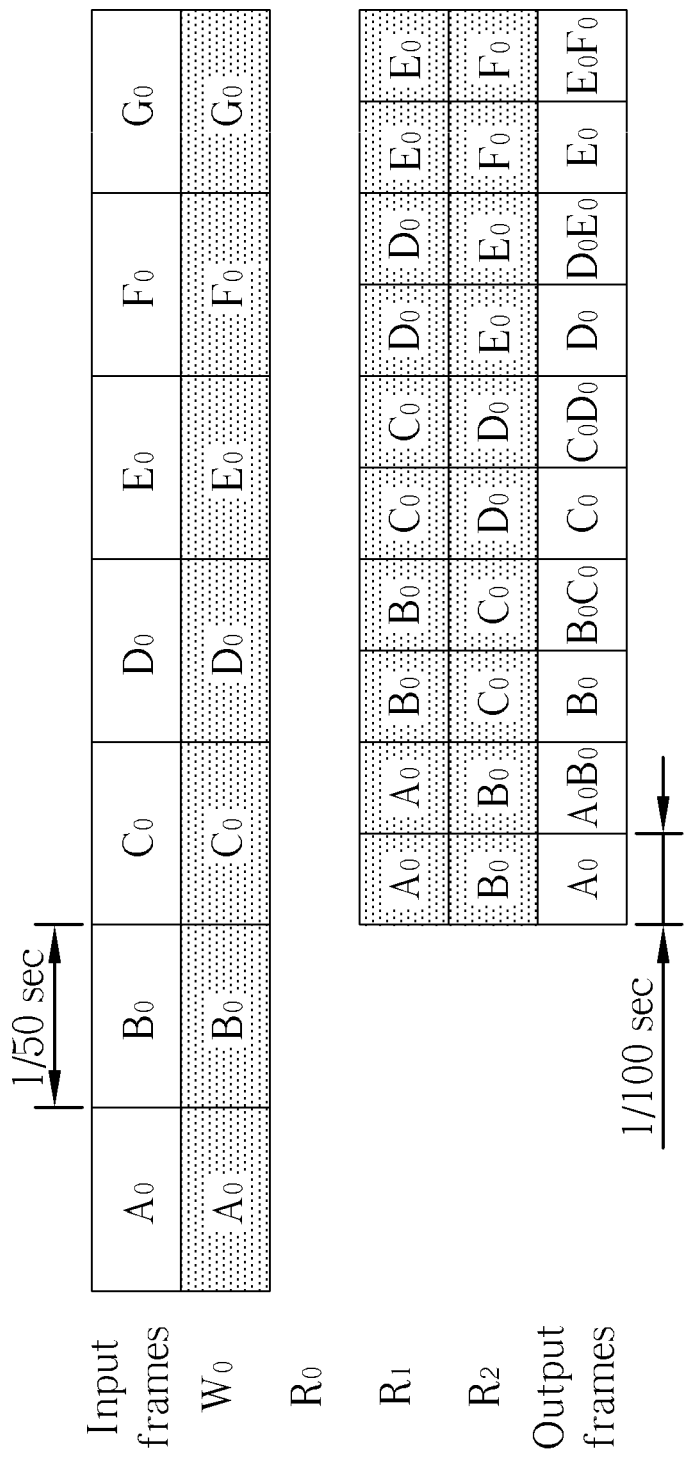
FIG. 5 is a timing diagram illustrating an exemplary operation of the apparatus 300 under the video mode.

FIG. 5 is a timing diagram illustrating the operation of the apparatus 300 of FIG. 3 under the video mode. In this example, the input frames include a sequence of video frames; under the video mode, all the video frames $A_0$-$G_0$ are written to the storage device 305 through the write data channel $W_0$. Similar to FIG. 4, the input frames have a transmission rate of 50 Hz, and the apparatus 300 converts the input frames into desired output frames with a frame rate of 100 Hz. The processing circuit 310 obtains two successive frames (e.g. $A_0$ and $B_0$) from the storage device 305 though read data channels $R_1$ and $R_2$ to generate interpolated frames (e.g. $A_0B_0$). $R_1$ and $R_2$ are also used to determine whether to enter the film mode by comparing data read though these two read data channels $R_1$ and $R_2$. The memory bandwidth requirement of the video mode is similar to the film mode, since there are also at most three memory accesses at a time (1 write plus 2 read operations).

Figure 6:
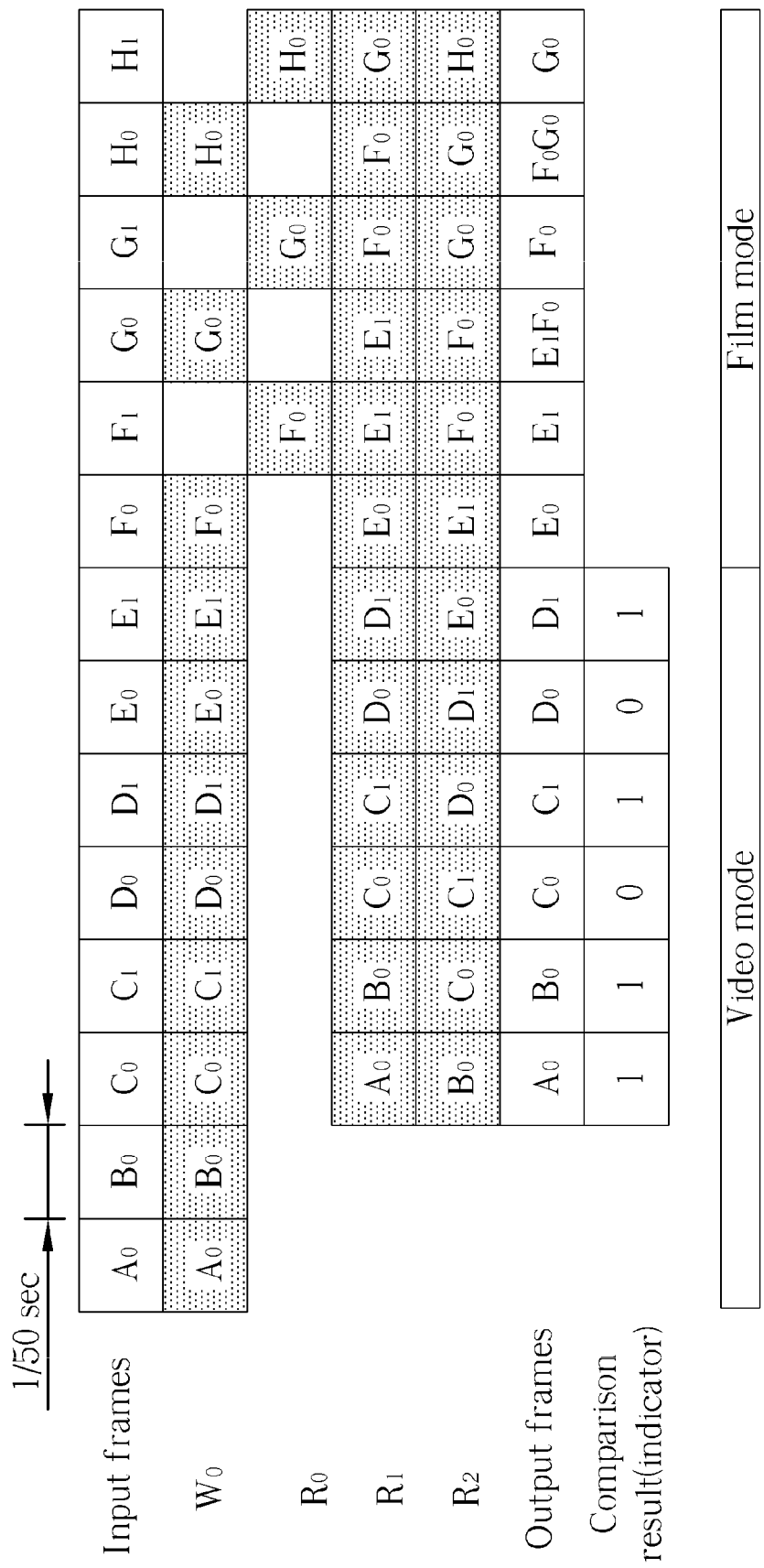
FIG. 6 is a timing diagram illustrating an exemplary operation of the apparatus 300 during an entrance of the film mode.

The apparatus 300 monitors input frames to ensure the apparatus 300 works under an appropriate operation mode based on the type of the input frames. The following lists two examples showing the algorithms used to switch between the film mode and video mode: one example of making decision on the timing of entering the film mode is shown in FIG. 6, while another example of making decision on the timing of exiting the film mode is shown in FIG. 7.

In order to simplify the following description, the input frame rate for either video frames or film frames is 50 Hz, and the desired display frame rate is also 50 Hz in these two examples. FIG. 6 is a timing diagram illustrating entrance of the film mode. As shown in FIG. 6, the input frames include video frames $A_0$, $B_0$, and film frames $C_0$, $C_1$, ..., $H_0$, $H_1$. The apparatus 300 is initially working in the video mode, and the processing circuit 310 compares every two adjacent frames read from the storage device 305 through the read data channels $R_1$ and $R_2$ for film mode detection. When the two frames are different, the processing circuit 310 will output a comparison result indicating these frames are different, e.g., an indicator showing a bit '1'. Otherwise, the processing circuit 310 outputs a comparison result indicating these frames are duplicates, e.g., an indicator showing a bit '0'. Since film frames are composed of interlaced original and duplicated frames, such as the film frames $C_0$, $C_1$, ..., $H_0$, $H_1$ in this example, a duplicated frame is inserted in every two original frames, the comparison result under the film mode is expected to be 01010101 ... and so on. The comparison result is stored and compares to a predefined pattern, if it matches the predefined pattern, the apparatus 300 enters the film mode. In this embodiment, the predefined pattern is "0101", so after two adjacent frames being duplicates are detected, the apparatus 300 enters the film mode. For instance, as shown in FIG. 6, the processing circuit 310 detects that the input frames $C_0$ and $C_1$, $D_0$ and $D_1$ are duplicates, computes the comparison result which matches the predefined pattern, and notifies the apparatus 300 to enter the film mode. The selection of the predefined pattern should not be a limit to the scope of the present invention.

Figure 7:
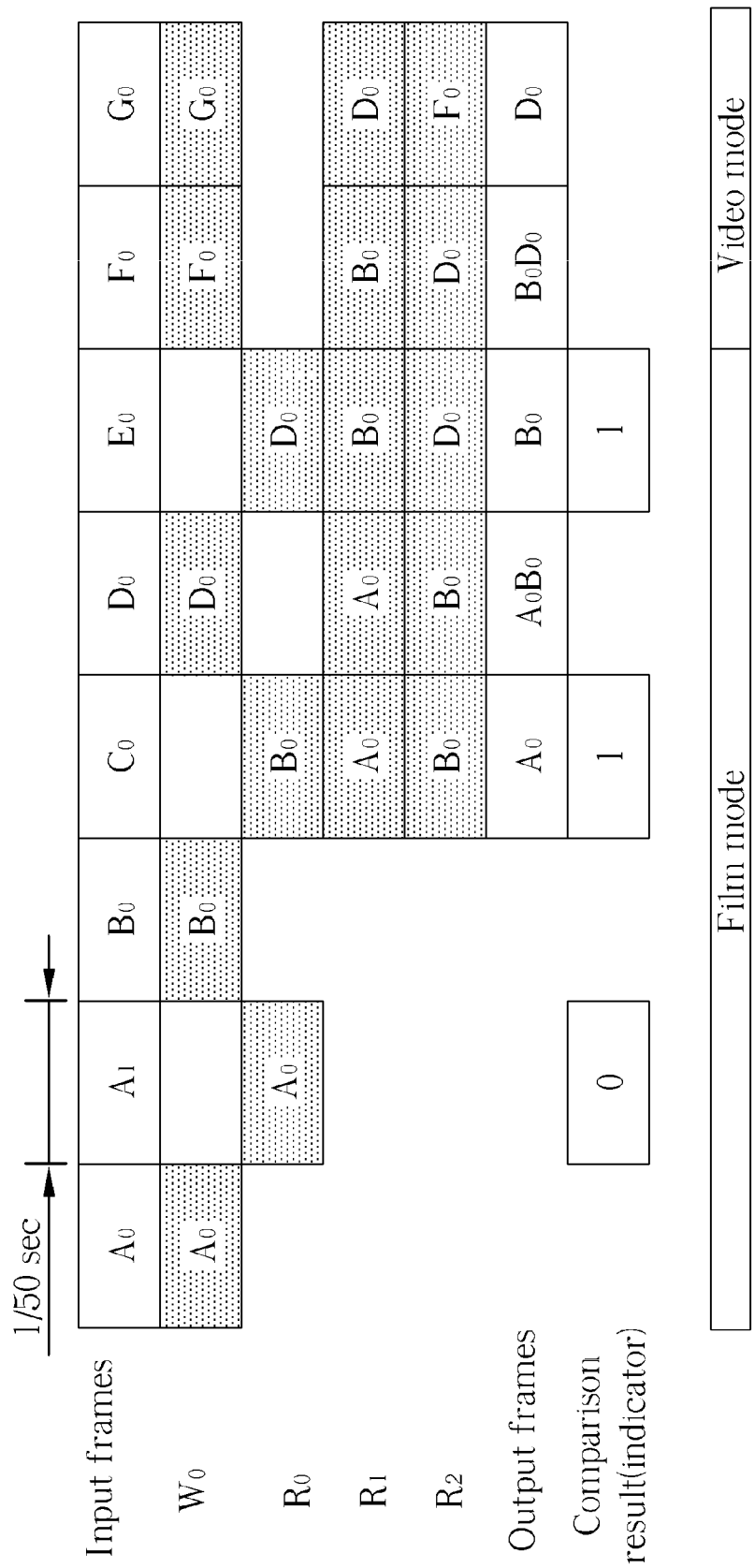
FIG. 7 is a timing diagram illustrating an exemplary operation of the apparatus 300 during an exit from the film mode.

FIG. 7 is a timing diagram illustrating exit of the apparatus 300 from the film mode. As shown in FIG. 7, input frames include film frames $A_0$ and $A_1$, and video frames $B_0$, $C_0$, ..., $F_0$, $G_0$. In the following description, every two successive input frames form a group consisting of a first frame and a second frame. For instance, a first frame $A_0$ and a second frame $A_1$ form a group, and a first frame $B_0$ and a second frame $C_0$ form another group, and so on. The apparatus 300 initially is under the film mode, and the processing circuit 310 compares a first frame (e.g., $A_0$, $B_0$, or $D_0$) read from the storage device 305 though the read data channel $R_0$ with a second frame (e.g., $A_1$, $C_0$, or $E_0$) being not stored in the storage device 305 (i.e. the input frames), for generating a comparison result indicating whether a group of two successive frames are duplicates. If the first frame (e.g., $A_0$) is identical to the second frame (e.g., $A_1$), the processing circuit 310 outputs a comparison result indicating these frames are duplicates, e.g., an indicator showing a bit '0'. Otherwise (e.g., the first frame $B_0$ is different from the second frame $C_0$), the processing circuit 310 outputs a comparison result indicating these frames are not duplicates, e.g., an indicator showing a bit '1'. Switching of the Input source from film frames to video frame is detected when the comparison result matches a predefined pattern such as "11" in this embodiment. As shown in FIG. 7, after two successive frames detected the frames as not duplicates twice by the processing circuit 310, the apparatus 300 exits the film mode since it is determined that the following input frames are video frames. For instance, as shown in FIG. 7, the processing circuit 310 detects that the successive frames $B_0$ and $C_0$, $D_0$ and $E_0$ are not duplicates respectively, computes the comparison result which matches the predefined pattern, and notifies the apparatus 300 to exit the film mode. The apparatus 300 can selectively exit the film mode according to a plurality of predefined pattern. This also falls within the scope of the present invention. In summary, whether under the film mode or video mode, the bandwidth of storage device 305 used for accessing data of frames is occupied by at most three data channels, so the apparatus 300 can make more effective use of the memory bandwidth.

In addition, although only the process of dealing with the input frames including film frames being the 2:2 sequence is illustrated in the above-mentioned examples, the spirit of the present invention can also be applied for input frames having film frames being the 3:2 sequence. For instance, under the film mode, the apparatus 300 stores only one frame into the storage device 305 without storing the duplicates in multiple repeated film frames, or the apparatus 300 also stores any two frames of three repeated film frames into the storage device 305 without storing all the three repeated film frames. Moreover, please refer to FIG. 4 again. Under the film mode, the apparatus 300 can store frames $A_1$, $B_1$, $C_1$, and $D_1$ into the storage device instead of frames $A_0$, $B_0$, $C_0$, and $D_0$. That is, the first frame to be stored in the storage device 305 should be not limited to the first incoming frame in the successive frames. This modification also obeys the spirit of the present invention. The apparatus 300 can of course also be utilized for converting input frames having any transmission frame rate into output frames, which is to be displayed with any display frame rate.

Those skilled in the art will readily observe that numerous modifications and alterations of the device and method may be made while retaining the teachings of the invention.

What is claimed is:

1. A method of interpolated frame generation and input source detection, the method comprising:
    receiving a input stream of input frames, wherein the input frames comprise at least a first frame and at least a second frame, and the first frame and the second frame are two successive frames in the input stream;
    storing the first frame of successive frames in the input frames into a storage device under a film mode and not storing the second frame of successive frames into the storage device under the file mode;
    storing the first frame of the two successive first and second frames into a storage device under a film mode;
    comparing the stored first frame with the second frame of the successive frames in the input frames not stored in the storage device to generate a first comparison result for determining whether to exit the film mode; and
    reading frames stored in the storage device to generate interpolated frames under the film mode.

2. The method of claim 1, further comprising:
    reading the first frame from the storage device while receiving the second frame.

3. The method of claim 1, further comprising:
    exiting the film mode when the first comparison result indicates that the first and second frames of the successive frames are not duplicates under the film mode.

4. The method of claim 1, further comprises exiting the film mode when the first comparison result matches a predefined pattern.

5. The method of claim 1, wherein the frames stored in the storage device and the interpolated frames form output frames.

6. The method of claim 1, further comprising:
    storing the input frames into the storage device under a video mode; and
    under the video mode, reading two of the successive frames from the storage device to generate a second comparison result for determining whether to enter the film mode.

7. The method of claim 6, further comprises entering the film mode when the second comparison result matches a predefined pattern.

8. The method of claim 6, further comprises generating interpolated frames using the successive frames read from the storage device under the video mode when an input frame rate is different from the output frame rate.

9. A method of interpolated frame generation and input source detection, the method comprising:
    receiving input frames;
    storing the input frames into a storage device under a video mode;
    under the video mode, reading two of successive frames from the storage device to generate a second comparison result for determining whether to enter a film mode; and
    entering the film mode when the second comparison result matches a predefined pattern;
    reading frames stored in the storage device to generate interpolated frames under the film mode;
    wherein the bandwidth of the storage device being used to generate interpolated frames and input source detection under either the video mode or film mode is at most three memory accesses at a time.

10. The method of claim 9, further comprising
    storing a first frame of successive frames in the input frames into a storage device under the film mode;
    comparing the stored first frame with a second frame of the successive frames not stored in the storage device to generate a first comparison result for determining whether to exit the film mode; and
    reading frames stored in the storage device to generate the interpolated frames under the film mode.

11. An apparatus of interpolated frame generation and input source detection, the apparatus comprising:
    a storage device, for storing at least a first frame of successive frames in a input stream of input frames under a film mode and not storing a second frame of successive frames into the storage device under the file mode, wherein and the first frame and the second frame are two successive frames in the input stream; and
    a processing circuit, receiving the input frames, reading frames stored in the storage device to generate interpolated frames under the film mode, and comparing the stored first frame with a second frame of the successive frames not stored in the storage device to generate a first comparison result for determining whether to exit the film mode.

12. The apparatus of claim 11, wherein the processing circuit reading the first frame from the storage device while receiving the second frame.

13. The apparatus of claim 11 exits the film mode when the first comparison result indicates that the first and second frames of the successive frames are not duplicates under the film mode.

14. The apparatus of claim 11 exits the film mode when the first comparison result matches a predefined pattern.

15. The apparatus of claim 11, wherein the frames stored in the storage device and the interpolated frames form a plurality of output frames.

16. The apparatus of claim 11, wherein the storage device stores the input frames under a video mode, and the processing circuit reads two of the successive frames from the storage device to generate a second comparison result for determining whether to enter the film mode under the video mode.

17. The apparatus of claim 16 enters the film mode when the second comparison result matches a predefined pattern.

18. The apparatus of claim 16, wherein the processing circuit generates interpolated frames using the successive frames read from the storage device under the video mode when an input frame rate is different from an output frame rate.

19. The apparatus of claim 11, wherein the bandwidth of the storage device used for interpolated frame generation and input source detection is kept at most three memory access at a time.

* * * * *